April 12, 1932.  F. E. CUENOUD  1,853,041
DEVICE FOR CONNECTING TO WEIGHING SCALES A
CALCULATING OR LIKE SECONDARY APPARATUS
Filed Jan. 9, 1930  3 Sheets-Sheet 1
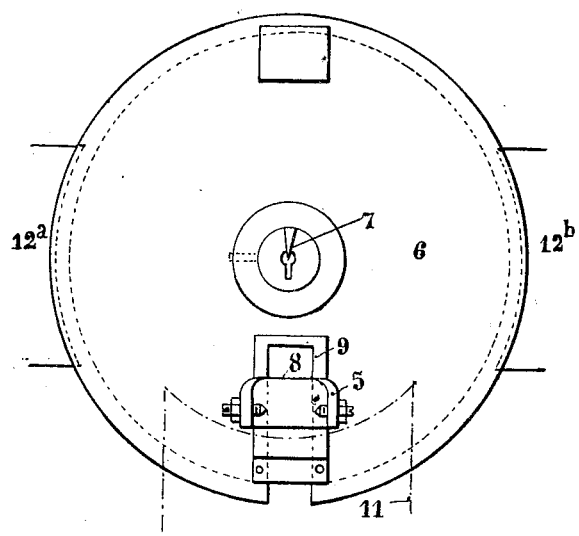
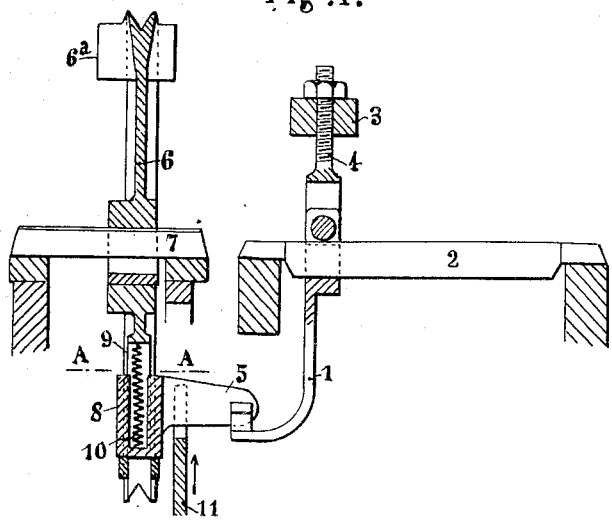
F. E. Cuenoud
INVENTOR
By: Marks & Clerk
Attys.

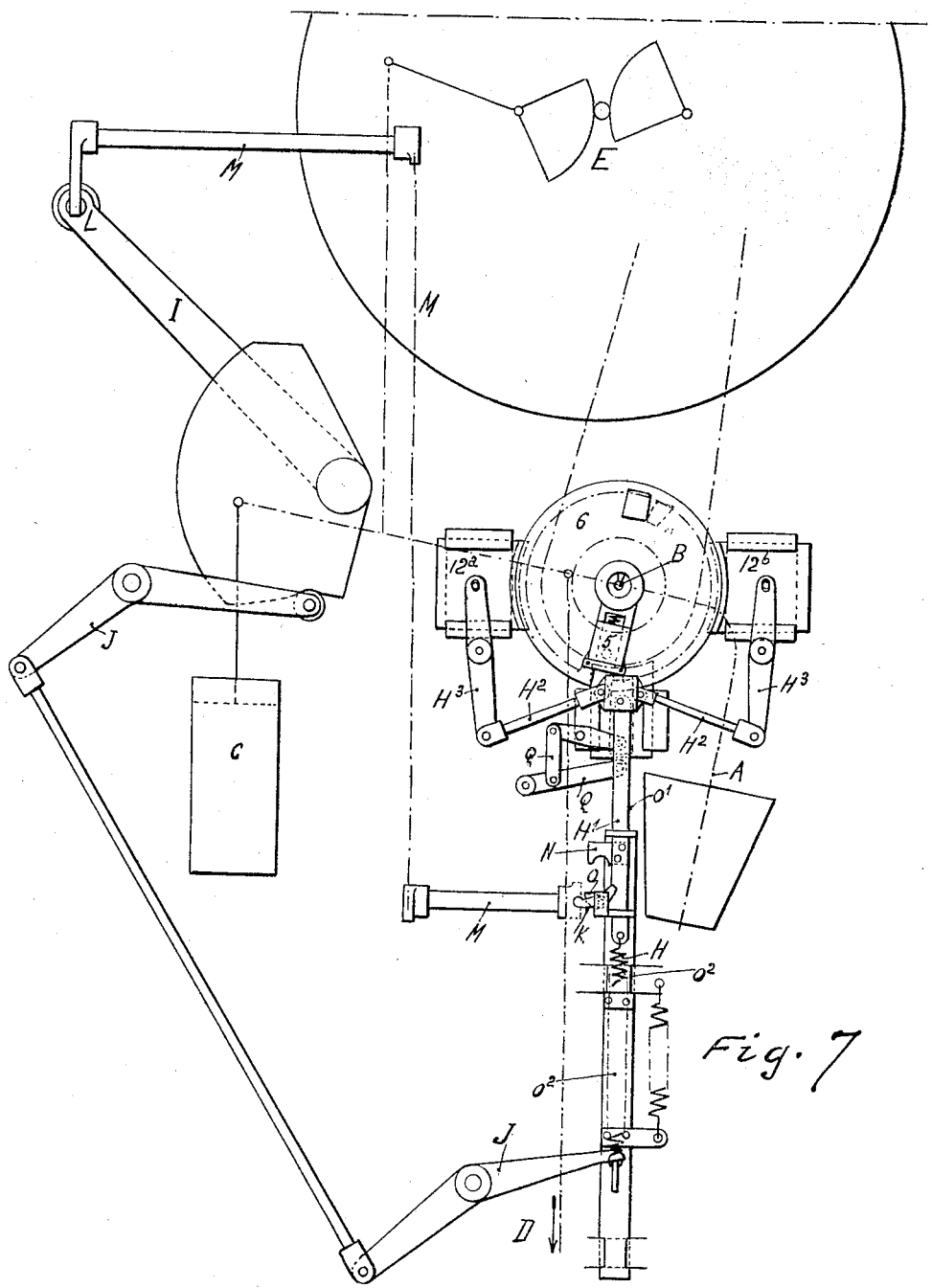

Patented Apr. 12, 1932

1,853,041

UNITED STATES PATENT OFFICE

FERNAND EUGÉNE CUÉNOUD, OF BORDEAUX, FRANCE

DEVICE FOR CONNECTING TO WEIGHING SCALES A CALCULATING OR LIKE SECONDARY APPARATUS

Application filed January 9, 1930, Serial No. 419,695, and in France February 6, 1929.

The present invention has for object a device for connecting to weighing scales a secondary apparatus, such as a calculating, weight recording, bag-filling-weighing or like apparatus.

This device is essentially constituted by a member following the movement of the index of the weighing scale, a movable element driven by this member, and means for releasing these two parts from each other, so as to render the index independent at this moment and to hold stationary the movable element which is provided with an abutment adapted to serve as a support or bearing for the secondary apparatus.

These elements are, moreover, combined, in accordance with the invention, with a device which allows of putting in action the secondary apparatus connected to the weighing scale only after the latter has stopped, and in which use is made of the oscillations of the fluid brake of the said weighing scale for moving a movable body which allows the engagement of the driving crank, or of the mechanism driving the secondary apparatus only when the said movable body is in the median position.

In order that the invention may be clearly understood, it will be described hereinafter with reference to the accompanying drawings, in which:

Fig. 1 is a longitudinal vertical section of the device connecting the weighing scale to a secondary apparatus.

Fig. 2 is a front view of the movable element serving as a bearing or support for this secondary apparatus.

Fig. 3 is a horizontal section made according to line A—A of Fig. 1.

Fig. 4 is a front view of the member following the angular displacements of the index of the weighing scale.

Figure 5:
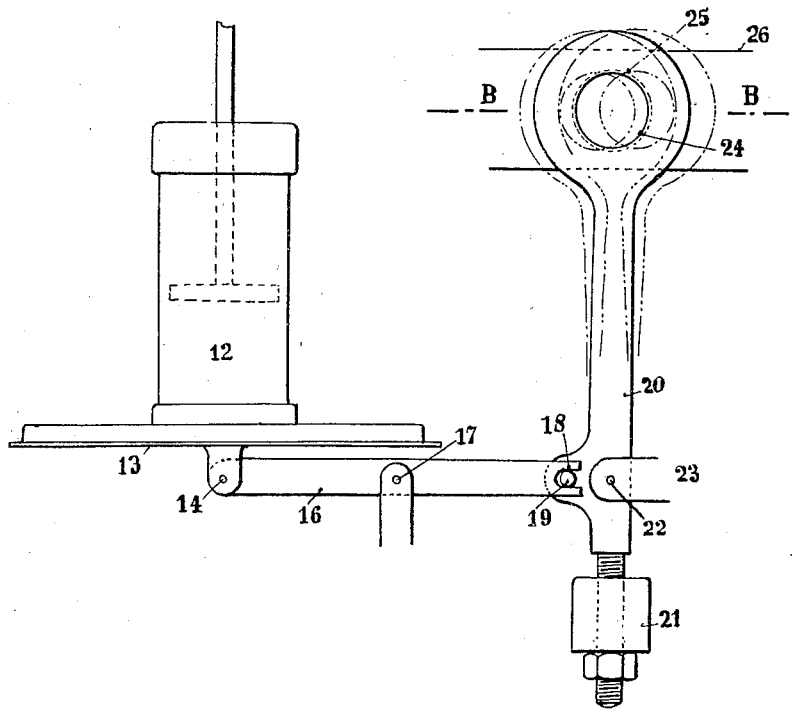

Fig. 5 in an elevation of the device allowing to put in action the secondary apparatus only after the oscillations of the index of the said weighing scale have stopped.

Figure 6:
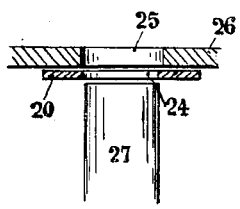

Fig. 6 is a partial horizontal section made according to line B—B of Fig. 5; and Figure 7 shows an assembly of a weighing scale.

As illustrated in Figs. 1 to 4, the device allowing to connect the weighing mechanism of a scale to a calculating or like secondary apparatus, is essentially constituted by an arm 1 which is secured in any suitable manner to the knife edge 2 carrying, for instance, the index of the weighing scale.

This arm 1, which thus follows the index in its displacements, is suitably balanced by means of a counter-weight 3, adjustable in position on a screw-threaded rod 4 secured to the said arm 1, the lower end of which extends between the branches of a fork 5.

This fork 5 is carried by a plate 6 which is mounted on a knife-edge 7 and is angularly moved, at each weighing operation, by the arm 1 which is actuated by the index of the weighing scale.

The plate 6 is balanced by abutment 6$^a$ which forms, on the other hand, a fulcrum for the calculating or like secondary apparatus connected to the weighing scale, when the said plate 6, at the end of each weighing operation, has been brought by the arm 1, in a position determined by that of the index of the weighing scale, and held stationary by the brakes 12$^a$ and 12$^b$ (Fig. 2) when the said index has reached its stopping point.

The fork 5 is rigid with a slide-block 8 which is guided in a radial slot 9 of the plate 6 and is subjected to the action of a spring 10, bearing against the bottom of the slot 9 and against the bottom of the slide-block 8, so as to normally return the latter and the fork 5 rigid with the same to the position shown in Fig. 1.

A push-piece 11, arranged under this fork 5 allows of moving the latter against the action of its spring 10, and to lift it above the lower branch of the arm 1, for releasing at the end of each weighing operation, the said arm 1 from the plate 6, after the latter has been immobilized by the brakes 12$^a$, 12$^b$ in the position imparted thereto by the index of the weighing scale, and for rendering, at this moment, the said scale absolutely independent from the plate 6.

The plate 6 which has been held stationary, as above described, by the action of the brakes 12ª and 12ᵇ and is, at this moment, rendered independent from the weighing scale, serves as a bearing or support for the secondary calculating or like apparatus.

For preventing the putting in action of the secondary apparatus before total stoppage of the weighing scale, the fluid brake 12, of the latter, which, as is known, is influenced by the movements of the index, is provided, as shown in Fig. 5, with a bottom constituted by a flexible metal diaphragm 13, of large diameter, which is distorted according to the pressures and partial vacua exerted in the brake cylinder by the displacement of the weighing system and is connected, at its center, by an axis 14 at the end of a lever 16 rocking at a fixed point 17 and terminating, at its other end, by a fork 18.

In this fork 18 is fitted a stud 19 of a lever 20 which, balanced by a counterweight 21 adjustable in position, is pivoted at 22 on a fixed support 23 and receives about its pivot 22, through the medium of the lever 16, angular displacements of variable amplitude according to the pressures and partial vacua exerted in the brake cylinder 12 by the movements of the index of the weighing scale.

In the upper end of the lever 20 is cut out a circular aperture 24 so arranged as to exactly come, at the full stopping position of the scale shown in full lines in Fig. 5, opposite a circular aperture 25, of slightly greater diameter, cut out a fixed member 26, for allowing, by introduction through these two apertures 24 and 25, of a cylindrical part 27 rigid with the secondary apparatus, to put the latter in action only after stoppage of the oscillation of the beam or of the index of the weighing scale.

In fact the pressures and partial vacua exerted in the brake by the displacements of the index of the scale are transmitted, through the medium of the flexible diaphragm 13, to the lever 20 and, consequently, to the aperture 24 of the latter so that this aperture moves opposite the fixed aperture 25 and that it is impossible, as long as these displacements last, to introduce through the said aperture the member 27 and, consequently, to start the secondary apparatus before complete stoppage of the weighing scale.

According to Figure 7, the weighing scale is represented by the balance A, the knife edge B, the brake C, the connection with the scale D of the balance and the connection with the index.

The connecting system comprises the disc 6 carried along by the balance according to the device described in the application. The brakes 12ª and 12ᵇ are controlled by the spring H acting on the slide H¹, rods and levers H² H³. It is maintained taut by the pawl or catch K.

*Braking.*

When pressing on a button L in the handle of the crank I the pawl or catch K is released or disengaged by the steering means M so that the spring H produces the tightening effect.

*Separation of the weighing system and the disc 6 which the secondary apparatus applies*

The disc 6 during the weighing has oscillated through an angle equal to that of the balance A; during the braking action, it is therefore in a position corresponding to the weight. When the slide H′ has terminated the braking action, a stub N, which it carries, comes in contact with a second catch O which holds a twin-slide O′. This is therefore released in its turn and carried along by another spring O²; it raises the fork 5 of the disc 6 through the medium of the device Q which releases the scale as described in the application.

The springs H and O² are stretched by the action of the crank I on the levers J.

The above described arrangements are of course given by way of example only, the forms, materials and dimensions as well as the details of construction can be varied without departing thereby from the scope of the invention.

Claims:—

1. Device for connecting to weighing scales having a knife edge and an index, a secondary apparatus, comprising: a member connected to the beam of the weighing scale and adapted to accompany the said index or the said beam in its angular displacements,—a second member adapted to be driven by the first one,—means for releasing these two members from each other, at the end of each weighing operation, and for rendering independent, at this moment, the index or beam of the scale,—means for holding the second member stationary in the position to which it has been moved by the first member after each weighing operation,—means carried by the second member and adapted to serve as bearing or support for the secondary apparatus,—means for preventing the putting in action of the secondary apparatus before complete stoppage of the index or beam of the scale.

2. Device for connecting to weighing scales having a knife edge and an index, a secondary apparatus, comprising: an arm, secured to the knife edge carrying the index of the weighing scale, and following the displacements of the said index, a counterweight at one of the ends of the said arm for balancing the latter,—a knife edge arranged in alignment with that carrying the index of the scale, a plate secured to this second knife edge, means carried by this plate and adapted to connect the said plate to the arm rigid with the knife edge carrying the index of the scale,—means for releasing the plate and the arm from each other, at the end of each weighing operation, and for rendering independent, at this moment, the knife edge carrying the index of the scale,—means for holding the plate stationary in the position to which it has been moved by the arm after each weighing operation,—means carried by this plate and adapted to balance the latter and to serve as a bearing or support for the secondary apparatus,—means for preventing the putting in action of the secondary apparatus before complete stoppage of the knife edge carrying the index of the scale.

3. Device for connecting to weighing scales having a knife edge and an index, a secondary apparatus, comprising: an arm, secured to the knife edge carrying the index of the weighing scale, and following the displacements of the said index, a counterweight at one of the ends of the said arm for balancing the latter,—a knife edge arranged in alignment with that carrying the index of the scale and the said balanced arm, a plate secured to this second knife edge, a radial slide cut out in the said plate, a slide-block movable in the said slide a fork rigid with the slide-block, a spring for pushing back this slide and the fork rigid therewith in a suitable position for ensuring the engagement, between the branches of the said fork, of the balanced arm secured to the knife edge carrying the index of the scale and the connection of the said plate and of the said arm,—means for releasing this plate and the said arm from each other, at the end of each weighing operation, and for rendering independent, at this moment, the knife edge carrying the index of the scale,—means for holding the plate stationary in the position to which it has been moved by the arm after each weighing operation,—means carried by this plate and adapted to balance the latter and to serve as a bearing or support for the secondary apparatus,—means for preventing the putting in action of the secondary apparatus before complete stoppage of the knife edge carrying the index of the scale.

4. Device for connecting to weighing scales having a knife edge and an index, a secondary apparatus, comprising: an arm, secured to the knife edge carrying the index of the weighing scale, and following the displacements of the said index, a counterweight at one of the ends of the said arm for balancing the latter,—a knife edge arranged in alignment with that carrying the index of the scale and the said balanced arm, a plate secured to this second knife edge, a radial slide cut out in the said plate, a slide-block movable in the said slide a fork rigid with the slide-block, a spring for pushing back this slide and the fork rigid therewith in a suitable position for ensuring the engagement, between the branches of the said fork, of the balanced arm secured to the knife edge carrying the index of the scale and the connection of the said plate and of the said arm,—a push piece arranged under the fork, and adapted to push back the latter and the slide-block rigid therewith at the end of each weighing operation, for releasing at this moment the plate and the balanced arm and rendering independent the knife edge carrying the index of the scale,—brake shoes adapted to come in engagement with the plate and to hold the latter stationary in the position to which it has been moved by the balanced arm at the end of each weighing operation,—means carried by this plate and adapted to balance the latter and to serve as a bearing or support for the secondary apparatus,—means for preventing the putting in action of the secondary apparatus before complete stoppage of the knife edge carrying the index of the scale.

5. Device for connecting to weighing scales having a knife edge and an index, a secondary apparatus comprising: an arm, secured to the knife edge carrying the index of the weighing scale, and following the displacements of the said index, a counterweight at one of the ends of the said arm for balancing the latter,—a knife edge arranged in alignment with that carrying the index of the scale and the said balanced arm, a plate secured to this second knife edge, a radial slide cut out in the said plate, a slide-block movable in the said slide a fork rigid with the slide-block, a spring for pushing back this slide and the fork rigid therewith in a suitable position for ensuring the engagement, between the branches of the said fork, of the balanced arm secured to the knife edge carrying the index of the scale and the connection of the said plate and of the said arm,—a push piece arranged under the fork, and adapted to push back the latter and the slide-block rigid therewith at the end of each weighing operation, for releasing at this moment the plate and the balanced arm and rendering independent the knife edge carrying the index of the scale,—brake shoes adapted to come in engagement with the plate and to hold the latter stationary in the position to which it has been moved by the balanced arm at the end of each weighing operation,—an abutment formed on the plate and adapted to balance the latter and to constitute a fulcrum for the secondary apparatus connected to the weighing scale,—means for preventing the putting in action of the secondary apparatus before complete stoppage of the index or beam of the scale.

6. Device for connecting to weighing scales having a knife edge and an index, a secondary apparatus comprising: an arm, secured to the knife edge carrying the index of the weighing scale, and following the displacements of the said index—a counterweight at one of the ends of the said arm for balancing the latter,—a knife edge arranged in alignment with that carrying the index of the scale and the said balanced arm, a plate secured to this second knife edge, a radial slide cut out in the said plate, a slide-block movable in the said slide a fork rigid with the slide-block, a spring for pushing back this slide and the fork rigid therewith in a suitable position for ensuring the engagement, between the branches of the said fork, of the balanced arm secured to the knife edge carrying the index of the scale and the connection of the said plate and of the said arm,—a push piece arranged under the fork, and adapted to push back the latter and the slide-block rigid therewith at the end of each weighing operation, for releasing at this moment the plate and the balanced arm and rendering independent the knife edge carrying the index of the scale,—brake shoes adapted to come in engagement with the plate and to hold the latter stationary in the position to which it has been moved by the balanced arm at the end of each weighing operation,—an abutment formed on the plate and adapted to balance the latter and to constitute a fulcrum for the secondary apparatus connected to the weighing scale,—a lever balanced by a counter-weight adjustable in position, and adapted to be angularly moved by the pressures and partial vacua exerted in the brake cylinder of the scale by the movements of the index of the latter, a circular aperture cut out in the said lever and adapted to exactly come opposite another fixed aperture of similar shape, after stoppage of the oscillations of the index of the scale, for allowing, at this moment only, the putting in action of the secondary apparatus connected to the scale by introduction of a cylindrical member in the apertures placed opposite each other.

7. Device for connecting to weighing scales having a knife edge and an index, a secondary apparatus comprising: an arm, secured to the knife edge carrying the index of the weighing scale, and following the displacements of the said index, a counter-weight at one of the ends of the said arm for balancing the latter,—a knife edge arranged in alignment with that carrying the index of the scale and the said balanced arm, a plate secured to this second knife edge, a radial slide cut out in the said plate, a slide-block movable in the said slide a fork rigid with the slide-block, a spring for pushing back this slide and the fork rigid therewith in a suitable position for ensuring the engagement, between the branches of the said fork, of the balanced arm secured to the knife edge carrying the index of the scale and the connection of the said plate and of the said arm,—a push piece arranged under the fork, and adapted to push back the latter and the slide-block rigid therewith at the end of each weighing operation for releasing at this moment the plate and the balanced arm and rendering independent the knife edge carrying the index of the scale,—brake shoes adapted to come in engagement with the plate and to hold the latter stationary in the position to which it has been moved by the balanced arm at the end of each weighing operation,—an abutment formed on the plate and adapted to balance the latter and to constitute a fulcrum for the secondary apparatus connected to the weighing scale,—a lever balanced by a counter-weight and journalled about a fixed axis, a fluid brake adapted, in the known manner, to be influenced by the movements of the index of the scale a flexible diaphragm of large diameter forming the bottom of the cylinder of the said brake, a lever connected to this diaphragm at one of its ends and at the other end to the said balanced lever, and adapted to transmit to the said balanced lever the distortions of the flexible diaphragm influenced by the pressures and partial vacua exerted in the brake cylinder by the movements of the index of the scale, a circular aperture cut out in the balanced lever and adapted to come exactly opposite another fixed aperture of similar shape, after stoppage of the oscillations of the index of the scale, for allowing, at this moment only, the putting in action of the secondary apparatus connected to the scale, by the introduction in the two apertures opposite each other of a suitable cylindrical member.

The foregoing specification of my device for connecting to weighing scales a calculating or like secondary apparatus, signed by me this 20th day of November, 1929.

FERNAND EUGÉNE CUÉNOUD.